(12) United States Patent
Kesler et al.

(10) Patent No.: US 10,495,247 B2
(45) Date of Patent: *Dec. 3, 2019

(54) CONNECTOR

(71) Applicant: Hanon Systems, Daejeon (KR)

(72) Inventors: Eric William Kesler, Northville, MI (US); Kastriot Shaska, Northville, MI (US); Anthony Davis, Jr., Romulus, MI (US); Christopher Turner, Dearborn, MI (US)

(73) Assignee: HANON SYSTEMS, Daejeon (KR)

( * ) Notice: Subject to any disclaimer, the term of this patent is extended or adjusted under 35 U.S.C. 154(b) by 123 days.

This patent is subject to a terminal disclaimer.

(21) Appl. No.: 15/690,663

(22) Filed: Aug. 30, 2017

(65) Prior Publication Data

US 2017/0363241 A1 Dec. 21, 2017

Related U.S. Application Data

(63) Continuation of application No. 13/601,167, filed on Aug. 31, 2012, now Pat. No. 9,777,878.

(51) Int. Cl.
*F16L 41/08* (2006.01)
*F16L 39/00* (2006.01)
*B60H 1/00* (2006.01)
*F28F 9/02* (2006.01)

(52) U.S. Cl.
CPC ........ *F16L 41/086* (2013.01); *B60H 1/00571* (2013.01); *F16L 39/00* (2013.01); *F28F 9/0253* (2013.01); *Y10T 29/49948* (2015.01)

(58) Field of Classification Search
CPC . F16L 39/00; F16L 39/02; F16L 3/237; F16L 41/086; F16L 37/56; F28F 9/0253; B60H 1/00571
See application file for complete search history.

(56) References Cited

U.S. PATENT DOCUMENTS

| | | |
|---|---|---|
| 2,227,677 A | 1/1941 | Siegal |
| 3,521,332 A | 7/1970 | Kramer |
| 3,869,153 A | 3/1975 | De Vincent et al. |
| 4,468,054 A | 8/1984 | Orth |
| 4,574,444 A | 3/1986 | Humpolik |

(Continued)

FOREIGN PATENT DOCUMENTS

| | | |
|---|---|---|
| DE | 102009026109 A1 | 1/2010 |
| EP | 1850045 A1 | 10/2007 |

(Continued)

*Primary Examiner* — James M Hewitt, II
(74) *Attorney, Agent, or Firm* — Shumaker, Loop & Kendrick, LLP; James D. Miller

(57) ABSTRACT

A connector for a component fitting assembly of an air conditioning system includes a substantially planar plate having a recessed portion and a slot portion. The recessed portion and the slot portion are formed in the plate to define an opening for receiving a conduit therein. A method for coupling the conduit to the connector includes the step of urging at least the portion of the conduit through the slot portion and into the recessed portion of the plate, whereby the at least the portion of the conduit is deformed to correspond with a configuration of the opening to militate against disengagement between the plate and the at least the portion of the conduit disposed in the opening of the plate.

20 Claims, 3 Drawing Sheets

(56) References Cited

U.S. PATENT DOCUMENTS

| | | | |
|---|---|---|---|
| 5,146,766 | A | 9/1992 | Martins |
| 5,341,566 | A | 8/1994 | Quitschau et al. |
| 5,464,179 | A | 11/1995 | Ruckwardt |
| 5,467,611 | A | 11/1995 | Cummings et al. |
| 5,860,681 | A | 1/1999 | Slais |
| 6,073,891 | A | 6/2000 | Humber |
| 6,318,765 | B1 | 11/2001 | Slais et al. |
| 6,443,224 | B2 | 9/2002 | Sasaki |
| 6,481,756 | B1 | 11/2002 | Field et al. |
| 6,868,684 | B2 | 3/2005 | Law et al. |
| 7,344,164 | B2 | 3/2008 | Ichimura et al. |
| 7,364,208 | B2 | 4/2008 | Ichimura et al. |
| 7,425,021 | B2 | 9/2008 | Yamanashi et al. |
| 7,926,853 | B2 | 4/2011 | Katoh et al. |
| 7,971,910 | B2 | 7/2011 | Holt et al. |
| 8,038,181 | B2 | 10/2011 | Marschall et al. |
| 9,777,878 | B2 * | 10/2017 | Kesler .................. F16L 39/00 |
| 2005/0029806 | A1 | 2/2005 | Yamanashi et al. |
| 2008/0256761 | A1 | 10/2008 | Bukoski |
| 2009/0322075 | A1 | 12/2009 | Marschall et al. |

FOREIGN PATENT DOCUMENTS

| | | |
|---|---|---|
| EP | 2322368 A2 | 5/2011 |
| FR | 2668242 A1 | 4/1992 |
| FR | 2711761 A1 | 5/1995 |
| FR | 2727493 A1 | 5/1996 |
| FR | 2841631 A1 | 1/2004 |
| GB | 2283070 A | 4/1995 |
| JP | 1976007696 U | 1/1976 |
| JP | 1995004976 U | 1/1995 |
| JP | 2000055243 A | 2/2000 |
| JP | 2006275254 A | 10/2006 |
| JP | 2007218439 A | 8/2007 |
| JP | 2010112656 A | 5/2010 |

\* cited by examiner

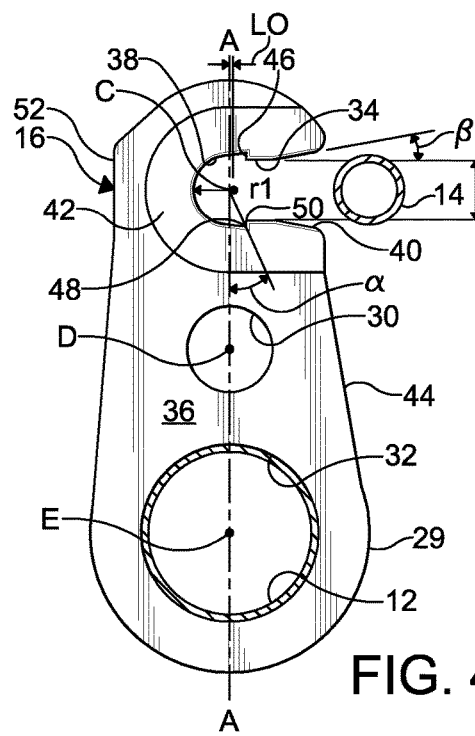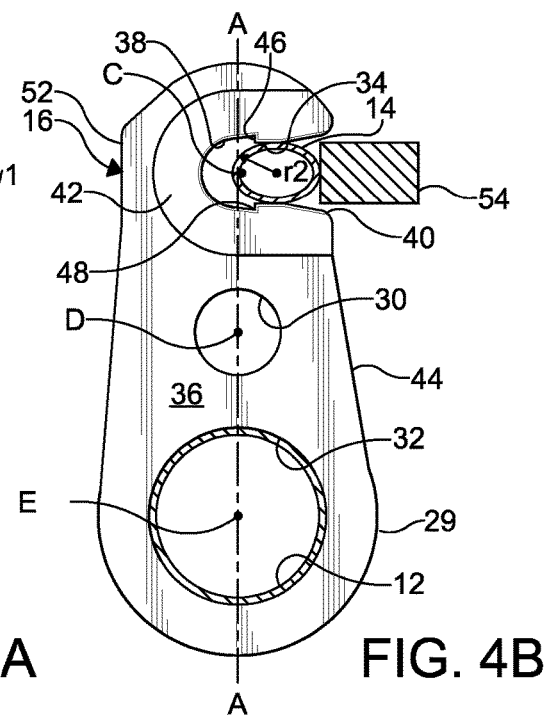
FIG. 4A
FIG. 4B
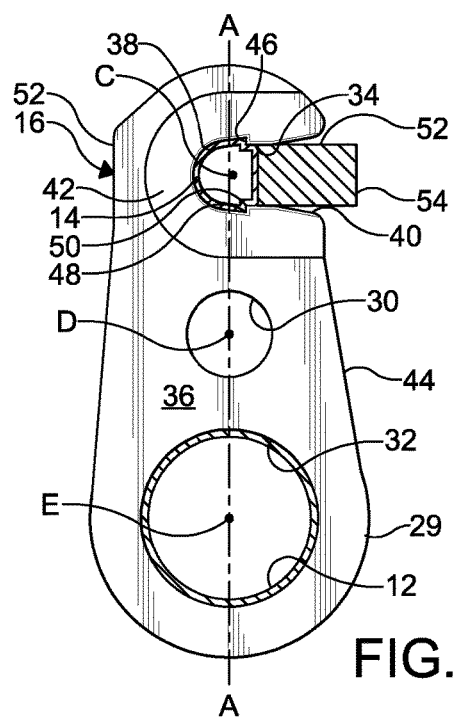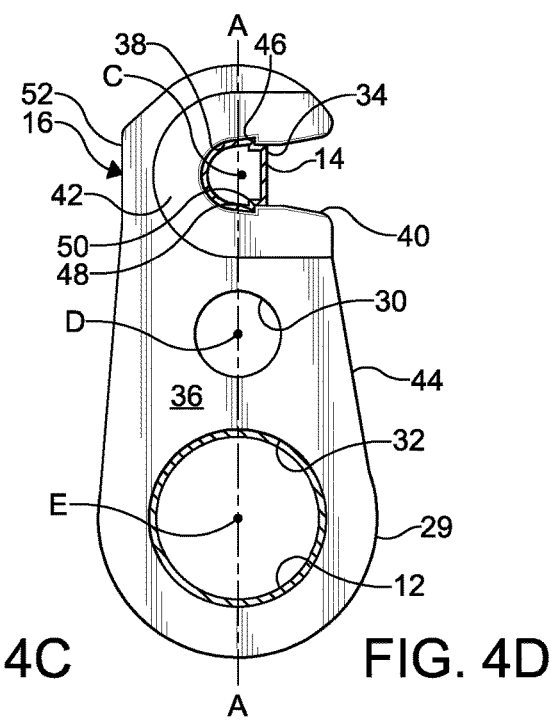
FIG. 4C
FIG. 4D

CONNECTOR

CROSS REFERENCE TO RELATED PATENT APPLICATION

This patent application is a continuation patent application of U.S. patent application Ser. No. 13/601,167, filed on Aug. 31, 2012 and now U.S. Pat. No. 9,777,878, the entire disclosure of which is hereby incorporated herein by reference.

FIELD OF THE INVENTION

The present invention relates to a connector. More particularly, the invention is directed to a connector for a component fitting assembly.

BACKGROUND OF THE INVENTION

Presently known automotive air conditioning systems generally include various components such as a compressor, a condenser, an evaporator, a thermostatic expansion valve, for example, and a plurality of conduits or lines that connect the various components. A suitable refrigerant is contained within the system. Installation of the various components of the air conditioning system is typically independent of one another with the conduit connected to the components after they are installed or mounted within an engine compartment of a vehicle. While different methods and apparatuses for securing the conduit to the various components are known, one method utilizes an o-ring encircling an end of conduit that provides a seal when the end of the conduit is secured in a port on the component.

To secure the end of the conduit to the component, a connection plate engages and traps the conduit in a conduit passage extending through the connection plate. The connection plate further includes a second passageway offset from and substantially parallel to the conduit passage. Once the conduit is inserted into a port on the component, a fastener extending through the second passageway secures the connection plate to the component whereby the end of the conduit is connected to the component.

Space limitations within the engine compartment, together with packaging considerations oftentimes complicates attachment of the conduit to the various components due to a location of the components within the engine compartment. Additionally, mass production of the vehicles limits a time to connect the conduit to the various components. Thus, it is beneficial to securely locate both conduits relative to each other for ease of assembly to the various components in the vehicle. Current component fitting assemblies are configured such that the conduits are either freely located which hinders the assembly operation or secured by a brazing process which is cost prohibitive.

Accordingly, it would be desirable to produce a component fitting assembly, which facilities an efficient and cost effective connection of conduits to a component of an automotive air conditioning system.

SUMMARY OF THE INVENTION

In concordance and agreement with the present invention, a component fitting assembly, which facilities an efficient and cost effective connection of conduits to a component of an automotive air conditioning system, has surprisingly been discovered.

In one embodiment, a connector comprises: a substantially planar plate including a recessed portion and a slot portion formed therein to define an opening for receiving a conduit therein, the plate configured to militate against disengagement between the plate and the conduit disposed in the opening formed in the plate.

In another embodiment, a component fitting assembly comprises: a first conduit for receiving a fluid therein; a second conduit for receiving the fluid therein; and a connector including a substantially planar plate including a first opening, and a recessed portion and a slot portion formed therein to define a second opening, the first conduit received in the first opening and the second conduit received in the second opening, wherein a shoulder formed in the plate militates against disengagement between the plate and the second conduit disposed in the second opening formed in the plate.

The present invention also relates to a method for coupling a conduit to a connector.

The method comprises the steps of: providing a substantially planar plate including a recessed portion and a slot portion formed therein, wherein the recessed portion and the slot portion define an opening for receiving at least a portion of the conduit therein; and urging the at least the portion of the conduit through the slot portion and into the recessed portion of the plate, whereby the at least the portion of the conduit is deformed to correspond with a configuration of the opening which militates against disengagement between the plate and the at least the portion of the conduit disposed in the opening of the plate.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIGS. 4A-4D are rear elevational views of the connector illustrated in FIG. 1 showing a method of coupling a conduit to the connector.

DETAILED DESCRIPTION OF THE INVENTION

The following detailed description and appended drawings describe and illustrate an exemplary embodiment of the invention. The description and drawings serve to enable one skilled in the art to make and use the invention, and are not intended to limit the scope of the invention in any manner.

Figure 1:
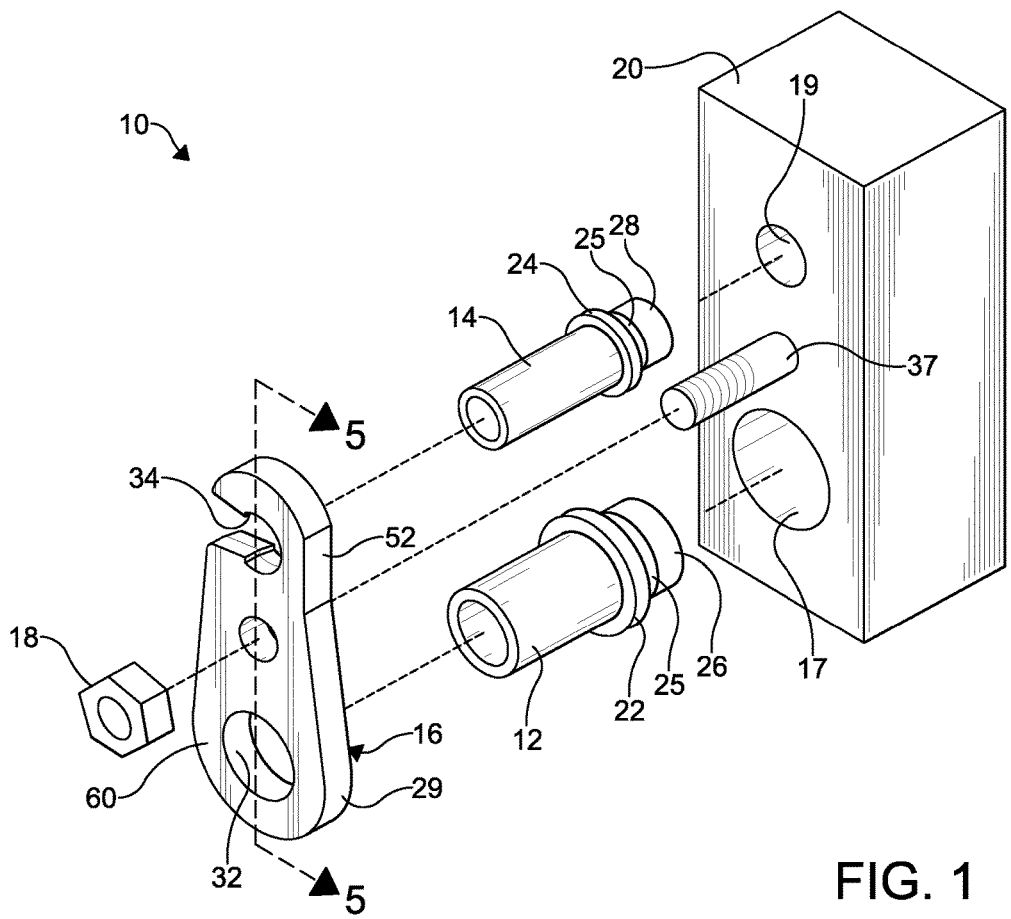
FIG. 1 is an exploded perspective view of a component fitting assembly including a connector according to an embodiment of the invention.

FIG. 1 shows a component fitting assembly 10 according to the present invention. The component fitting assembly 10 includes a suction line or outlet conduit 12 and a high-pressure line or inlet conduit 14, a connector 16, a coupling mechanism 18 (i.e. a threaded nut), and a component 20 of an air conditioning (A/C) system (not shown) such as an thermostatic expansion valve (TXV) having ports 17, 19 formed therein, for example. The outlet conduit 12 and the inlet conduit 14 are connected to the component 20 and correspondingly provide a return line and a supply line for a pressurized fluid such as a refrigerant used in the A/C system, for example. In certain embodiments, the outlet conduit 12 has a relatively large outer diameter and serves as a low pressure side refrigerant conduit of the A/C system. The inlet conduit 14 has a relatively small outer diameter in relation to the outlet conduit 12 and serves as a high pressure side refrigerant conduit of the A/C system. Radially outwardly extending annular flanges 22, 24 are formed about of the conduits 12, 14, respectively. The flanges 22, 24 each provide a planar surface for receiving a sealing element 25 thereon. As shown, the flanges 22, 24 are axially offset from respective ends 26, 28 of the conduits 12, 14 to permit at least a portion of the ends 26, 28 of the conduits 12, 14 to be received in the ports 17, 19 of the component 20 of the A/C system.

Figure 2:
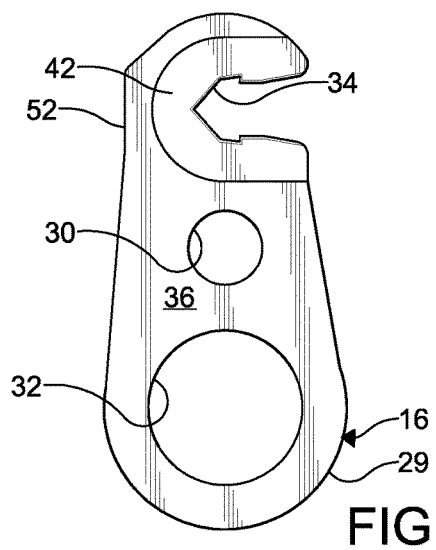
FIG. 2 is a rear elevational view of a connector according to another embodiment of the invention.
Figure 3:
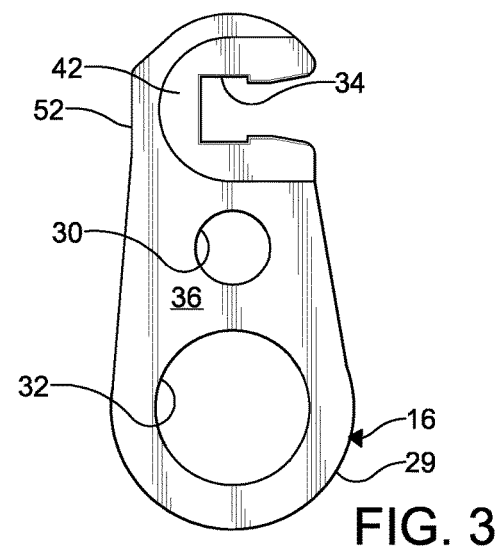
FIG. 3 is a rear elevational view of a connector according to another embodiment of the invention.

As illustrated, the connector 16 includes a substantially planar plate 29 provided with a central aperture 30 and a pair of spaced apart openings 32, 34 formed therein. The central aperture 30 and the openings 32, 34 are formed through a thickness of the plate 29 in a direction substantially perpendicular to a substantially planar first surface 36 of the plate 29. The central aperture 30 is configured to receive a fastening member 37 of the component 20 therein for coupling the connector 16 thereto. The openings 32, 34 are configured to receive the outlet conduit 12 and the inlet conduit 14, respectively. The opening 32 is formed adjacent a first end of the plate 29 and the opening 34 is formed adjacent an opposing second end of the plate 29. In certain embodiments, the central aperture 30 and the opening 32 each have a generally circular shape. However, various other configurations of the central aperture 30 and the opening 32 can be employed if desired. It is understood that the opening 32 can have any suitable inner diameter to cooperate with the outlet conduit 12. The opening 34 shown has a generally mushroom-shape. Various configurations of the opening 34 can be employed as desired such as a generally triangular shape as shown in FIG. 2, a generally square shape as shown in FIG. 3, a generally rectangular shape, or a generally irregular shape, for example.

As more clearly illustrated in FIGS. 4A-4D, the plate 29 includes a recessed portion 38 and a slot portion 40 formed therein to define the opening 34. In certain embodiments, a raised region 42 is formed on the first surface 36 of the plate 29 around the opening 34 to facilitate substantially flush contact of the flanges 22, 24 with the component 20. The recessed portion 38 has a generally semi-circular shape and a radius (r1) corresponding to a radius (r2) of the inlet conduit 14 after insertion into the opening 34. A center (C) of the semi-circular recessed portion 38 is laterally offset from a center (D) of the central aperture 30 and a center (E) of the opening 32 towards the slot portion 40. A lateral offset (LO) facilitates proper alignment of the conduits 12, 14 after the insertion of the inlet conduit 14 into the opening 34, and thereby ensures proper assembly of the conduits 12, 14 with the component 20 of the A/C system. In certain embodiments, the lateral offset (LO) is calculated by subtracting a width (w1) of the slot portion 40 in a direction substantially parallel to a longitudinal axis A of the plate 29 and directly adjacent the recessed portion 38 from the outer diameter of the inlet conduit 14, and then dividing by two (2). In other words, the lateral offset=0.5*[the outer diameter of the inlet conduit 14–the width (w1) of the slot portion 40 in the direction substantially parallel to the longitudinal axis A of the plate 29 and directly adjacent the recessed portion 38].

In a non-limiting example, the lateral offset (LO) is in a range of about 0.25 mm to about 1.0 mm. In yet another non-limiting example, the lateral offset (LO) is about 0.5 mm. It is understood, however, that the lateral offset (LO) can be any suitable amount as desired to ensure proper assembly of the conduits 12, 14 with the component 20 of the A/C system.

As shown, the recessed portion 38 terminates at a shoulder 46 forming an inside corner 48. An angle α between a plane substantially perpendicular to the first surface 36 of the plate 29 which extends along the longitudinal axis A and the inside corner 48 is in a range of about 100 degrees to about 130 degrees. The recessed portion 38 is configured to deform a portion of the inlet conduit 14 into an elliptical shape when the inlet conduit 14 is inserted therein. It is understood that the angle α can be any suitable angle to produce a desired shape and configuration of the inlet conduit 14. For example, a relatively larger angle α decreases the elliptical shape of the portion of the inlet conduit 14 resulting in more circular shape of the portion of the inlet conduit 14, and a relatively smaller angle α increases the elliptical shape of the portion of the inlet conduit 14 resulting in a more elongated elliptical shape of the portion of the inlet conduit 14. In certain embodiments, the angle α depends upon an outer diameter of the inlet conduit 14 and a desired center position of the inlet conduit 14 after insertion into the opening 34.

As illustrated, the slot portion 40 extends laterally outwardly from the shoulder 46 to an outer peripheral edge 44 of the plate 29. The width (w1) of the slot portion 40 in the direction substantially parallel to the longitudinal axis A of the plate 29 increases from the recessed portion 38 to the outer peripheral edge 44, thereby providing a lead-in to guide the inlet conduit 14 into the slot portion 40. In certain embodiments, an angle β of the lead-in for the inlet conduit 14 to properly engage the slot portion 40 is in a range of about 7 degrees to about 25 degrees. It is understood that the angle β can be any suitable angle to guide the inlet conduit 14 into the opening 34. In other embodiments, the width (w1) of the slot portion 40 varies in a range of about 70% to about 95% of the outer diameter of the inlet conduit 14. As a non-limiting example, the width (w1) of the slot portion 40 in the direction substantially parallel to the longitudinal axis A of the plate 29 and directly adjacent the recessed portion 38 is 1 mm less than the outer diameter of the inlet conduit 14.

Figure 5:
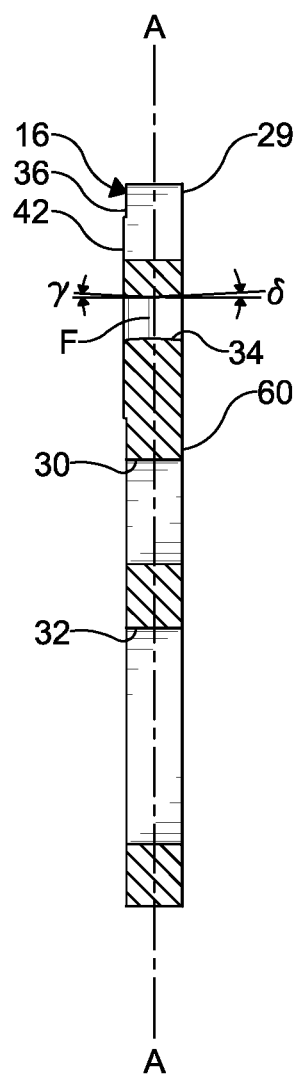
FIG. 5 is a cross-sectional side elevational view of the connector illustrated in FIG. 1 taken along line 5-5 of FIG. 1.

An outside corner 50 is formed between the shoulder 46 and the slot portion 40. An edge of the outside corner 50 is configured to protrude or "bite" into the inlet conduit 14 to militate against a lateral movement of the inlet conduit 14 and a disengagement of the inlet conduit 14 from the connector 16, as well as militates against a rotational movement of the inlet conduit 14 within the recessed portion 38. As shown in FIG. 5, the plate 29 about the opening 34 is formed with a first draft angle γ and a second draft angle δ. In certain embodiments, a size of the opening 34 decreases in the direction substantially perpendicular to the first surface 36 from the first surface 36 to a parting line (F) and increases in the direction substantially perpendicular to the first surface 36 from the parting line (F) to a substantially planar second surface 60. Accordingly, the size of the opening 34 is minimized at the parting line (F). The first draft angle γ of the plate 29 militates against an axial movement of the inlet conduit 14 in a direction substantially perpendicular to and away from the first surface 36 of the plate 29, and therefore, militates against a disengagement of the inlet conduit 14 from the opening 34. Similarly, the second draft angle δ of the plate 29 militates against an axial movement of the inlet conduit 14 in a direction substantially perpendicular to and away from the second surface 60, and therefore, also militates against a disengagement of the inlet conduit 14 from the opening 34. It is understood that the first draft angle γ and the second draft angle δ can be either distinct or substantially identical. In a non-limiting example, each the first draft angle γ and the second draft angle δ is about 3 degrees. As illustrated in FIG. 5, the parting line (F) formed between the first draft angle γ and the second draft angle δ is offset in respect of a central plane substantially parallel to the first surface 36 of the plate 29 extending along the longitudinal axis A towards the first surface 36.

In certain embodiments shown in FIGS. 1-4D, the outer peripheral edge 44 of the plate 29 may also include a substantially planar portion 52 formed adjacent the second end of the plate 29 opposite the slot portion 40. The substantially planar portion 52 provides a stable surface for tooling or fixture to contact during the insertion of the conduit 14 into the opening 34.

A method of coupling the conduit 12 with the connector 16, and more particularly, affixing the conduit 12 within the opening 32 can be accomplished by any means as desired such as by a brazing process, a welding process, a crimping process, an adhesive, and the like, for example. It is also understood that the conduit 12 can be freely disposed in the opening 32 if desired.

After the conduit 12 is coupled to the connector 16, the conduit 14 is then coupled thereto. It is understood, however, that the conduit 14 can be coupled to the connector 16 prior to the coupling of the conduit 12 to the connector 16 if desired. A method of coupling the conduit 14 with the connector 16 is shown in FIGS. 4A-4D. In particular, the conduit 14 is pressed into the opening 34 using a press die or mechanism 54. A portion of the conduit 14 adjacent the flange 24 is aligned with the opening 34, as shown in FIG. 4A, and guided by the lead-in into the slot portion 40 of the opening 34. As the portion of the conduit 14 is urged through the slot portion 40, the portion of the conduit 14 is deformed. In certain embodiments, the portion of the conduit 14 is deformed into a substantially elliptical shape as shown in FIG. 4B. The mechanism 54 continues to press the portion of the conduit 14 through the slot portion 40 and into the recessed portion 38. As the portion of the conduit 14 is pressed into the recessed portion 38, the portion of the conduit 14 is further deformed. In certain embodiments, the portion of the conduit 14 is deformed into a substantially mushroom shape as shown in FIG. 4C. As a result, the portion of the conduit 14 is caused to abut the shoulder 46 and the outside corner 50 protrudes into the inlet conduit 14. Once the portion of the conduit 14 is pressed into the recessed portion 38, the mechanism 54 is withdrawn from the opening 34 as shown in FIG. 4D.

To assemble the component fitting assembly 10, the respective ends 26, 28 of the outlet conduit 12 and inlet conduit 14 are received in the respective ports 17, 19 such that the ends 26, 28 of the conduits 12, 14 engage the component 20. The sealing elements 25 located on the ends 26, 28 of the conduits 12, 14 create an annular seal between the flanges 22, 24 of the conduits 12, 14 and the component 20. As known in the art, the connector 16 and threaded fastener 37 along with the coupling mechanism 18 provide a compressive force to hold the conduits 12, 14 in position in the component 20.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A connector comprising:
    a substantially planar plate including a recessed portion and a slot portion formed therein to define an opening for receiving a conduit therein, wherein a shoulder is formed between the recessed portion and the slot portion, the shoulder has a stepped portion between an inside corner and an outside corner, the stepped portion deforms the conduit inserted therein and applies an inward force to the conduit to militate against a lateral movement of the conduit and a disengagement of the conduit from the connector, as well as militates against a rotational movement of the conduit within the recessed portion, and another opening is formed in the substantially planar plate, the another opening circumscribed by the planar plate.

2. The connector according to claim 1, wherein the shoulder prevents an axial movement of the conduit disposed in the opening formed in the plate.

3. The connector according to claim 1, wherein the opening formed in the plate has a generally mushroom shape and the another opening has a generally circular shape.

4. The connector according to claim 1, wherein the recessed portion terminates at the shoulder.

5. The connector according to claim 1, wherein the recessed portion has a generally semi-circular shape.

6. The connector according to claim 5, wherein the recessed portion has a radius corresponding to a radius of the conduit after insertion into the opening formed in the plate.

7. The connector according to claim 5, wherein a center of the recessed portion is laterally offset towards the slot portion of the plate in respect of a center of another opening formed in the plate.

8. The connector according to claim 1, wherein the recessed portion has one of a generally triangular shape, a generally square shape, a generally rectangular shape, and a generally irregular shape.

9. The connector according to claim 1, wherein the slot portion extends laterally outwardly from the recessed portion to an outer peripheral edge of the plate.

10. The connector according to claim 1, wherein a width of the slot portion in a direction substantially parallel to a longitudinal axis of the plate increases from the recessed portion to an outer peripheral edge.

11. The connector according to claim 1, wherein the plate about the opening is formed with a first draft angle and a second draft angle to prevent an axial movement of the conduit disposed in the opening formed in the plate.

12. The connector according to claim 1, wherein the plate includes an outer peripheral edge having a substantially planar portion formed opposite the slot portion to provide a stable surface for a tooling or a fixture to contact during an urging of the conduit into the opening formed in the plate.

13. A component fitting assembly comprising:
    a first conduit for receiving a fluid therein;
    a second conduit for receiving the fluid therein; and
    a connector including a substantially planar plate including:
        a first opening circumscribed by the planar plate; and
        a recessed portion and a slot portion formed in the planar plate to define a second opening;
        wherein the first conduit is received in the first opening and the second conduit received in the second opening, a shoulder is formed between the recessed portion and the slot portion, the shoulder has a stepped portion between an inside corner and an outside corner, and the stepped portion deforms the second conduit inserted therein and applies an inward force to the second conduit to militate against a lateral movement of the second conduit and a disengagement of the second conduit from the connector, as well as militates against a rotational movement of the second conduit within the recessed portion.

14. The component fitting assembly according to claim 13, wherein the recessed portion has one of a generally semi-circular shape, a generally triangular shape, a generally square shape, a generally rectangular shape, and a generally irregular shape.

15. The component fitting assembly according to claim 13, wherein the slot portion extends laterally outwardly from the recessed portion to an outer peripheral edge of the plate.

16. A method for coupling a conduit to a connector, the connector including a substantially planar plate having a recessed portion and a slot portion formed therein, wherein the recessed portion and the slot portion define an opening for receiving at least a portion of the conduit therein, a shoulder is formed between the recessed portion and the slot portion, the shoulder has a stepped portion between an inside corner and an outside corner, and wherein the stepped portion deforms the conduit inserted therein and applies an inward force to the conduit to militate against a lateral movement of the conduit and a disengagement of the conduit from the connector, as well as militates against a rotational movement of the conduit within the recessed portion, and another opening is formed in the substantially planar plate, the another opening circumscribed by the planar plate, the method comprising the step of:

urging the at least the portion of the conduit through the slot portion and into the recessed portion of the plate, whereby the at least the portion of the conduit is deformed to correspond with a configuration of the opening.

17. The method according to claim 16, wherein the shoulder prevents at least one of a rotational movement, a lateral movement, and an axial movement of the at least the portion of the conduit disposed in the opening formed in the plate.

18. The method according to claim 16, wherein the opening formed in the plate has a generally mushroom shape.

19. The method according to claim 16, wherein a press die urges the at least the portion of the conduit into the opening formed in the plate.

20. The method according to claim 16, wherein the at least the portion of the conduit is urged into the opening formed in the plate subsequent a coupling of another conduit with the plate.

* * * * *